Dec. 7, 1971 J. C. ROITEL 3,625,048
DEVICE FOR RECORDING WIDTH VARIATIONS OF A FABRIC
Filed March 3, 1970  2 Sheets-Sheet 1
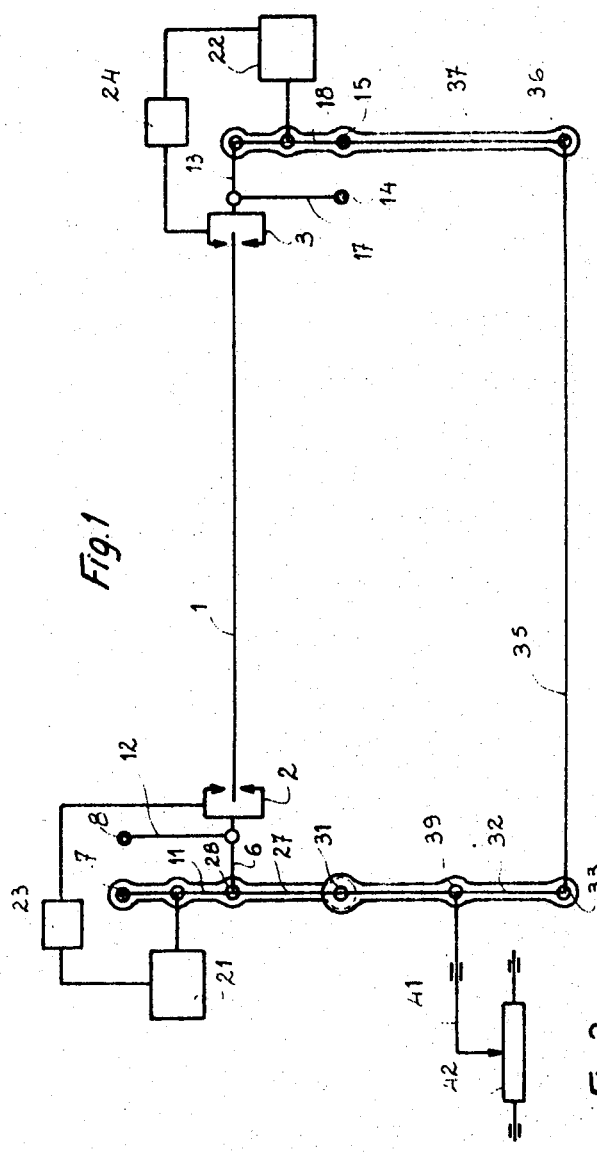
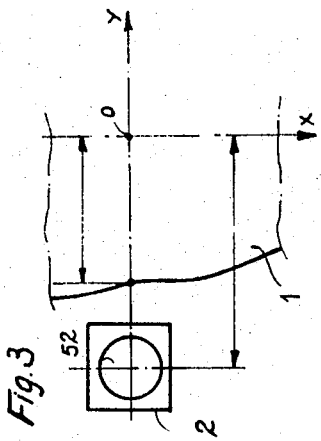
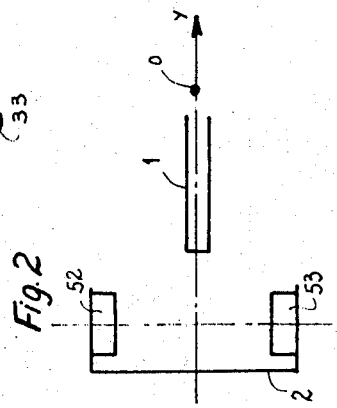
INVENTOR:
J. C. Roitel
By Richards & Geier
ATTORNEYS

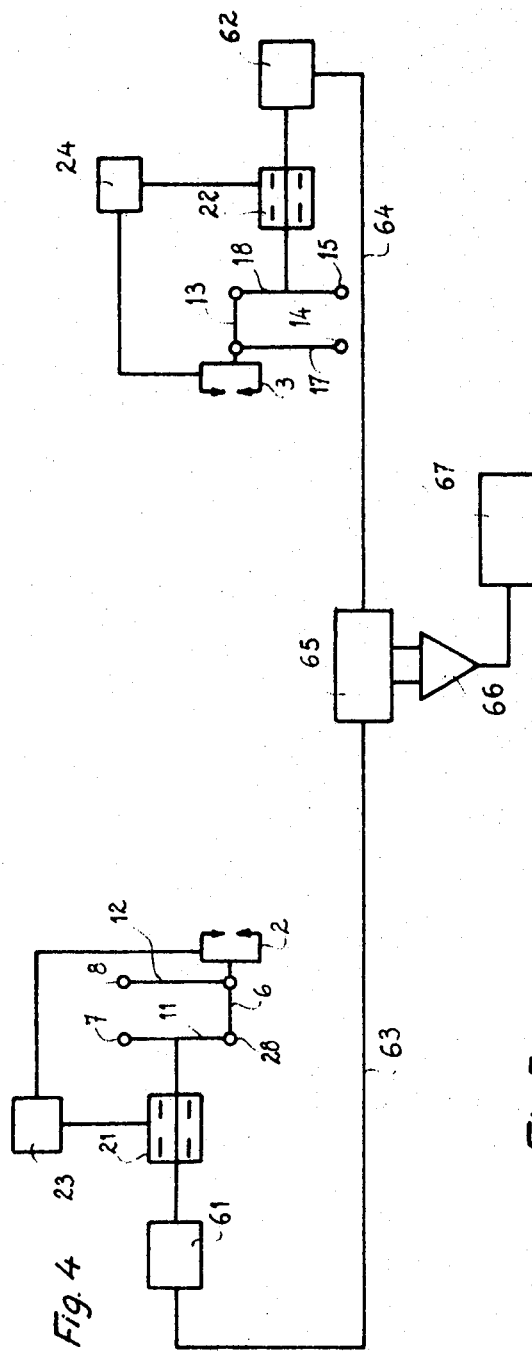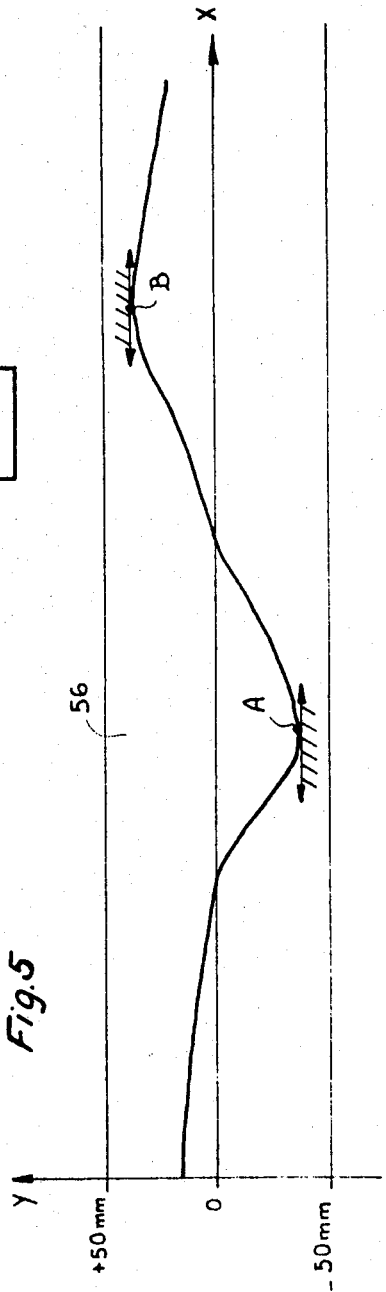

United States Patent Office 3,625,048
Patented Dec. 7, 1971

1

3,625,048
DEVICE FOR RECORDING WIDTH VARIATIONS OF A FABRIC
Jean Claude Roitel, Paris, France, assignor to Centre d'Etudes Techniques des Industries de l'Habillement, Paris, France
Filed Mar. 3, 1970, Ser. No. 16,075
Claims priority, application France, Mar. 4, 1969, 6905869
Int. Cl. G01b 13/04
U.S. Cl. 73—37.7          2 Claims

ABSTRACT OF THE DISCLOSURE

A device used for recording the width of a fabric which is unrolling, by measuring the algebraic difference of the instantaneous lateral shifts of the two selvedges of the fabric. The device consists of a combination of the following part: a proximity detector of each of the two edges of the fabric, movable in a direction transverse to that of the unrolling of the fabric; a device for driving the shifts of each of the two detectors in response to the signals emitted by this latter so as to monitor the position of the said detector continually in response to the instantaneous position of the corresponding edge of the fabric; a device for measuring the instantaneous position of each of the two detectors; a system adapted to effect the algebraic difference of the instantaneous shifts of the two detectors; and means for recording the said difference.

---

The invention relates to the measurement and the recording of the variations in the width of pieces of fabric.

Recording apparatus for widths already exist. Some ensure the positioning of one of the edges of the fabric against a fixed guide and measure the lateral shifts of the other edge of the piece whilst this latter is unrolling. Others measure the shifts of each of the two edges of the fabric while it is unrolling and, by means of a suitable transmitter, effect the algebraic difference of these two shifts.

The apparatuses of the first type have the disadvantage of raising serious difficulties in order to oblige one of the edges of the fabric to follow exactly a fixed guide.

The present invention relates to the apparatuses of the second type.

In these apparatuses of the second type, mechanical, electro-mechanical, electronic or even electrical means have already been used.

All these known means lead to comparatively costly embodiments.

In addition, the mechanical or electro-mechanical means which comprise feelers or selvedge guides have the disadvantage of having a great inertia and of lacking precision, more especially at the high unrolling speeds of the fabric.

The electronic means comprise one or more rows of photosensitive elements such as photoelectric cells or photosensitive resistors, arranged in a direction perpendicular to the unrolling direction of the fabric, above the zone of the selvedges. Each of these elements acts by all or nothing, so that a very large number thereof is necessary if one needs to measure widths with precision or widths capable of comparatively large variations.

The electrical means comprise a variable resistor and their precision is inadequate.

2

The aim of the invention is to bring into effect a width recording device of the type which effects the algebraic difference of the shifts of the two edges of the fabric whilst this latter is unrolling, and which does not have the aforesaid disadvantages of the conventional devices.

To this end, the width recording device in accordance with the invention comprises: a proximity detector for each of the two selvedges of the fabric, movable in a direction transverse to that of the unrolling of the fabric; a device for driving the shift of the said detector in response to the signals emitted by this latter so as to subjugate or monitor the position of the detector continually to the instantaneous position of the corresponding edge of the fabric; a device for measuring the instantaneous position of each of the two detectors; a system adapted to effect the algebraic difference of the instantaneous shifts of the two detectors; and means for recording the said difference.

Such a width recording device therefore works without any contact with the selvedges of the fabric; it is very economical and of a high precision practically independent of the speed of unrolling of the fabric during the measuring.

The invention will be better understood by reading the following description and by examining the attached drawings which show, by way of non-restrictive examples, several embodiments of a width recorder in accordance with the invention.

In the drawings:

FIG. 1 represents diagrammatically, in front view, an electro-mechanical recording device for widths in accordance with the invention.

FIGS. 2 and 3 represent diagrammatically, in front and in plan view, respectively, one of the two proximity detectors of FIG. 1 and the corresponding edge of the fabric.

FIG. 4 shows another embodiment of a width recording device in accordance with the invention, comprising electro-mechanical elements and electronic elements; and FIG. 5 shows an example of width measurement recording.

The device represented diagrammatically in FIG. 1 is intended for the measurement of the width of a fabric 1, the rapid unrolling of which is ensured by an suitable conventional means (not shown).

This device comprises substantially two proximity detectors 2, 3 in the zone of the two selvedges of the fabric respectively. These two proximity detectors are movable parallel to the plane of the fabric 1 in a direction perpendicular to the longitudinal direction of this fabric. To this end, each of them, for example the detector 2, is secured to the side 6 of an articulated parallelogram the opposite side of which is determined by two fixed pivots 7, 8 whilst the other two sides are constituted by two levers 11, 12 respectively.

In a similar manner, the other detector 3 is secured to one side 13 of an articulated parallelogram identical to the previous one but orientated in the converse direction and the opposite side of which is determined by two fixed pivots 14, 15, the other two sides of this parallelogram being designated by 17 and 18 respectively.

The two proximity detectors 2 and 3 are compelled to follow strictly the two corresponding edges of the fabric whilst this latter is unrolling, under the action of two driving devices 21, 22 respectively, which react to the signals which are supplied to them by the two detectors, through the medium of two amplifiers 23, 24. In this way, the two detectors are monitored by the two edges of the fabric.

To effect the measurement of the algebraic difference of instantaneous shifts of the two detectors 2 and 3, that is to say the variations of width, there is provided, in this embodiment, an entirely mechanical system which comprises: an extension 27 of the lever 11 beyond the articulation point 28 of this lever on the side 6 of the corresponding articulated parallelogram, the length of the said extension being equal to the length of the lever 11. Articulated on the end 31 of this extension 27 is one end of a swingle bar 32 rocking lever of double the length of that of the lever 11 between the articulation points 7 and 28 of this latter, the other end 33 of the said swingle bar being articulated on one end of a connecting rod 35, the other end of which is articulated as at 36, on the end of an extension 37 of the other lever 18, of double the length of that of this lever and situated on the side opposed to the fixed pivoting point 15 of this latter, the centre 39 of the swingle bar 32 being connected to the movable input element 41 of a shift recording apparatus of any suitable conventional type designated in its entirety by 42.

The proximity detectors 2 and 3 are of any suitable conventional type, for example photosensitive elements, such as photoelectric cells or else photosensitive resistors capable, in any event, of emitting and conducting, to the amplifier 23 and 24, a signal each time the position of the corresponding selvedge edge is modified in relation to the position of the detector during the unrolling of the fabric 1. These detectors could be of any other suitable known type, for example pneumatic detectors connected suitably to suitable amplifiers 23, 24.

In FIGS. 2 and 3 there has been represented, on a larger scale, the detector 2 in the form of an assembly comprising an emitter of luminous rays 52 and a photoelectric receiving cell 53. The edge of the fabric 1 intercepts the beam between the emitter 52 and the receiver 53 each time that the left-hand edge of the fabric (in this example) is displaced towards the left, and, on the contrary, it allows this beam to pass when it is displaced towards the right. There is therefore produced a change of state of the detector 2 each time the edge of the fabric 1 crosses the optical axis of the detector 2.

The other detector 3 is arranged symmetrically in relation to the longitudinal median vertical plane containing the axis of the fabric 1, so that the state of this detector will be modified each time the right-hand edge of the fabric crosses the optical axis of the said detector.

The operation of the apparatus is as follows:

During the unrolling of the fabric 1, the signals supplied by the two proximity detectors 2 and 3 excite, through the medium of the two amplifiers 23 and 24, the two devices 21 and 22 for driving the shift of the said detectors, so that these latter are perfectly monitored by the position of the two edges of the fabric, respectively, at every moment.

Any transverse shift of the left-hand edge of the fabric produces therefore a shift in the corresponding direction of the detector 2, and, consequently, a corresponding pivoting of the lever 11. In the same way, any transverse shift of the right-hand edge of the fabric gives rise to a corresponding shift of the detector 3 and a corresponding pivoting of the lever 18. Taking into account the respective lengths of the various levers of the apparatus, the centre 39 of the swingle bar 32 is shifted by an amount equal to the algebraic difference of the shifts of the two detectors 2 and 3, so that this shift is the strict image of the variation of the width of the fabric 1 in the course of its unrolling. The shifts of the centre 39 of the swingle bar 32 are transmitted to the input element 41 of the recorder 42. This latter comprises, for example, a tape 56 (FIG. 5) which unrolls, in the direction of the axis OX, at a linear speed proportional to the unrolling speed of the fabric, but on a reduced scale, for example in the ratio of 1 to 100 whilst the shifts of the element 41 of the recorder are inscribed, in the direction of the axis OY, in full size; the result is that one can read, on the recording tape 56, the width variations on a full size. By way of example, there has been indicated a scale of variation of width which extends over 50 mm. on either side of a zero point O, which allows variations of width of 100 mm. to be measured. The point A of this recording shows a point of minimum width and the point B a point of maximum width of the fabric.

In FIG. 4 there has been represented another embodiment of a width recorder which also comprises two proximity detectors 2 and 3, preferably having photosensitive elements, equally monitored to the edges of the fabric by shift driving devices 21, 22, placed under the control of the amplifiers 23, 24, which receives the signals from these two proximity detectors.

All these members can be identical to those of the embodiment of FIG. 1, but the method of measuring the shifts of the two detectors and of calculating their algebraic difference is different. To this end, the two shift devices 21 and 22 actuate, respectively, two linear captors 61, 62 which deliver voltages the values of which will be a function of the positions of a movable member of the driving devices 21 and 22 as from an original position. The values of the two voltages supplied by the captors 61 and 62 are conducted, by two conductors 63, 64, to an electronic device 65 which effects their algebraic difference. This device is connected, through the medium of an amplifier 66, to a suitable recorder 67.

The two proximity readers 2 and 3, still monitored by the two edges of the fabric, therefore being about, through their shifts, variations in the output voltages of the two captors 61 and 62 and the alegbraic difference of these voltages is registered in the recorder 67, the indications of which are, accordingly, a translation of the width variations.

The electronic system 65 can be conceived to allow if necessary the separate study of the shifts of each of the two edges of the fabric.

Whatever may be the embodiment chosen, all these apparatuses have great sensitivity; they are not subjected to reactions on the part of the edge of the fabric since there is no contact between the said edges and the proximity detectors; there is no discontinuity in the measuring of the width since the detection is not effected in steps but in a continuous manner; finally, the apparatus is insensitive to the whole of external disturbances, such as variations of feed voltage, of drift, etc. since the measuring is effected by the appreciation of the shifts of the detectors whose movements are perfectly monitored by the lateral movements of the edges of the fabric during its unrolling.

The invention is, of course, not restricted to the embodiments described and shown which have been given by way of examples; numerous modifications can be made thereto, according to the applications envisaged, without however departing from the scope of the invention.

I claim:

1. A device for recording the variations of the width of a moving strip, comprising: two proximity detectors for detecting respectively the two edges of the strip, said proximity detectors being movable in a direction transverse to that of the moving strip; a device for shifting each of said two detectors in response to the signals emitted by said detectors so as to monitor the position of the said detectors continually in accordance with the instantaneous position of the corresponding edge of the strip; a device for measuring the instantaneous position of each of said two proximity detectors; a system adapted to effect the alegbraic difference of the instantaneous shifts of said detectors; and means for recording said difference; said device for measuring the instantaneous position of each of said detectors and said system adapted to effect the algebraic difference of the instantaneous shifts of said proximity detectors being constituted by an assembly of articulated levers.

2. A recording apparatus according to claim 1, wherein said system of articulated levers comprises two pivoting levers of equal lengths and opposed directions connected respectively to said two proximity detectors, one of said pivoting levers having an extension on the side of the point of said one lever connected to the corresponding proximity detector, said extension having a length equal to that of said one lever, a swingle bar the length of which is double the length of said one pivoting lever, said swingle bar having one end articulated on said extension of said one pivoting lever, a connecting rod having one end connected to the other end of said swingle bar, the other of said two pivoting levers having an extension the length of which is double the length of said other pivoting lever and situated on the side opposed to the pivoting point of said other pivoting lever, the other end of said connecting rod being connected to the end of said extension of said other pivoting lever, and a shift recording apparatus having an input member, the middle point of said swingle bar being connected to said input member.

References Cited

UNITED STATES PATENTS

| | | | |
|---|---|---|---|
| 2,674,151 | 4/1954 | Garrett et al. | 356—159 UX |
| 3,387,757 | 6/1968 | Graffy et al. | 226—45 X |
| 2,810,316 | 10/1957 | Snyder | 356—159 |
| 3,204,109 | 8/1965 | Goodwin | 250—219 WD X |
| 3,225,988 | 12/1965 | Drenning | 226—45 X |
| 3,428,817 | 2/1969 | Hofmeister et al. | 250—219 WD X |

LOUIS R. PRINCE, Primary Examiner

W. A. HENRY II, Assistant Examiner

U.S. Cl. X.R.

26—57 E; 250—219 WD; 356—159